United States Patent [19]

Shibata et al.

[11] Patent Number: 5,416,640
[45] Date of Patent: May 16, 1995

[54] OBJECTIVE ACTUATOR

[75] Inventors: Yasumasa Shibata, Hirakata; Kenichiro Urairi, Yawata; Takao Hayashi, Katano; Kazuhiko Fujikawa, Takatsuki, all of Japan

[73] Assignee: Matsushita Electric Industrial Co., Ltd., Osaka, Japan

[21] Appl. No.: 927,239

[22] Filed: Aug. 7, 1992

Related U.S. Application Data

[63] Continuation of Ser. No. 616,850, Nov. 21, 1990, abandoned.

[30] Foreign Application Priority Data

Nov. 24, 1989 [JP] Japan .................................. 1-305405
Sep. 25, 1990 [JP] Japan .................................. 2-255810

[51] Int. Cl.⁶ .......................... G02B 7/02; G11B 7/00
[52] U.S. Cl. ............................ 359/823; 359/813; 369/44.15
[58] Field of Search ............................ 350/247, 252; 369/44.11–44.19, 246–248, 44.21–44.26; 359/813–814, 819–824

[56] References Cited

U.S. PATENT DOCUMENTS

| 4,511,212 | 4/1985 | Tanaka | 350/255 |
|---|---|---|---|
| 4,571,026 | 2/1986 | Maruta | 350/247 |
| 4,643,522 | 2/1987 | Takashima | 350/255 |
| 4,660,190 | 4/1987 | Fujii et al. | 369/44.16 |
| 4,703,470 | 10/1987 | Castagna et al. | 369/247 |
| 4,731,777 | 3/1988 | Yoshitoshi et al. | 369/246 |
| 4,817,076 | 3/1989 | Van Sluys et al. | 369/44.21 |
| 4,969,715 | 11/1990 | Nishihara et al. | 350/247 |
| 4,998,802 | 3/1991 | Kasuga et al. | 350/247 |
| 5,109,368 | 4/1992 | Ohta et al. | 369/44.15 |

FOREIGN PATENT DOCUMENTS

| 48311 | 11/1983 | Japan | 369/247 |
|---|---|---|---|
| 201538 | 10/1985 | Japan | 350/247 |
| 154237 | 7/1987 | Japan | 369/44.21 |
| 287438 | 12/1987 | Japan | . |
| 136326 | 6/1988 | Japan | 369/44.15 |
| 214931 | 9/1988 | Japan | 369/44.21 |
| 235041 | 9/1989 | Japan | . |
| 2244427 | 9/1990 | Japan | . |
| 263337 | 10/1990 | Japan | 369/44.15 |
| 78025 | 7/1992 | Japan | 369/247 |

OTHER PUBLICATIONS

English Abstract of Japanese reference No. 2244427.

*Primary Examiner*—Martin Lerner
*Assistant Examiner*—Thong Nguyen
*Attorney, Agent, or Firm*—Ratner & Prestia

[57] ABSTRACT

In an objective holder actuator assembly comprising an objective, an objective holder, a bearing, a focusing control coil, a tracking control coil and a balancer, an acrylate resin member is disposed between an objective holder and focusing and tracking control coils and the objective holder is made of ceramic material to reduce the resonance peak values of the movable segment of the objective actuator at high-order resonance frequencies and increase the high-order resonance frequencies.

6 Claims, 5 Drawing Sheets

OBJECTIVE ACTUATOR

This application is a continuation of application Ser. No. 07/616,850 filed Nov. 21, 1990, now abandoned.

BACKGROUND OF THE INVENTION

1. Field of the Invention

The present invention relates to an objective actuator which is, for example, used in an optical recording and playback device adapted to focus a light beam from a light source such as a semiconductor laser onto an information recording medium to record and reproduce information.

2. Brief Description of the Prior Art

The architecture of the conventional objective actuator of this type is illustrated in FIGS. 8 and 9. Thus, a base 1 comprising a magnetic metal plate to be fixed between a light source and an information recording medium in an optical information recording and playback system is provided with a through-aperture 2 for passage of the light beam from a light source. The base 1 is further provided with an installation hole 4 for rigidly supporting a shaft 3 in a position adjacent to said aperture 2 and a rubbery spring 5 disposed on one side of said installation hole which is opposite to the side on which said aperture 2 is situated. Disposed in juxtaposition on a straight line perpendicular to the line interconnecting said aperture 2, installation hole 4 and rubbery spring 5 are a pair of arcuate magnet holders 7a and 7b which are designed to support projecting arcuate magnets 6a and 6b, respectively. Arcuate magnetic path members 8a and 8b are disposed externally of said magnet holders 7a and 7b at a predetermined spacing therefrom. A bearing 9, which is freely rotatable and vertically movable, is fitted over shaft 3. An objective holder 10 made of polyphenylene sulfide resin, epoxy resin or the like material is fitted and secured in position around bearing 9. An objective 11 is fitted into beam incidence aperture 19 formed in objective holder 10 in a position corresponding to the aperture 2 of base 1. A line passing through the center of objective 11 and apertures 19, 2 and 17 comprises the light axis of the optics, or the optic axis. A balancer 13 having a retaining pin 12 engageable with rubbery spring 5 is assembled into objective holder 10. Attached to the periphery of objective holder 10 is a ring-shaped focusing control coil 14, the outer periphery of which, in turn, is provided with four arcuate tracking control coils 15. These two kinds of coils are disposed in a space between the magnets 6a, 6b on the one hand and the magnetic path members 8a, 8b on the other hand. All the above parts, as assembled, are covered with a cover 16, which is formed with relief windows 17 and 18 in positions corresponding to the objective 11, bearing 9 and balancer 13.

In the above arrangement, defocus of the light beam with respect to the surface of the information recording medium and off-track of the light beam with respect to a track groove on the information recording medium, is detected. In accordance with the respective detection signals, the focusing control coil 14 and tracking control coils 15 are energized to cause the magnets 6a and 6b and magnetic path members 8a and 8b to form a magnetic field and, utilizing the resulting magnetic flux, drive the object holder 10 up and down and rotate it to control the relative position of the objective 11.

However, in the above arrangement, since the movable segment comprised of objective 11, objective holder 10, bearing 9, focusing control coil 14, tracking control coils 15 and balancer 13 is secured in position with an adhesive or cement, the movable segment has low high-order resonance frequencies and high resonance peak values at these high-order resonance frequencies both in the focusing direction parallel to the light axis of the optics and in the tracking direction perpendicular to the light axis of said optics. This makes it difficult to allow the beam spot from the objective following the plane deflection and radial offset of the information recording medium, that is to say, the stability of servo performance is poor.

OBJECT AND SUMMARY OF THE INVENTION

It is a primary object of the present invention to provide an objective actuator which is excellent in the stability of focusing and tracking servo performance. The present invention provides an objective actuator which is high in high-order resonance frequencies in the focusing and tracking directions of the moval segment thereof and low in the resonance peak values at these high-order resonance frequencies.

DETAILED DESCRIPTION OF THE INVENTION

Figure 1:
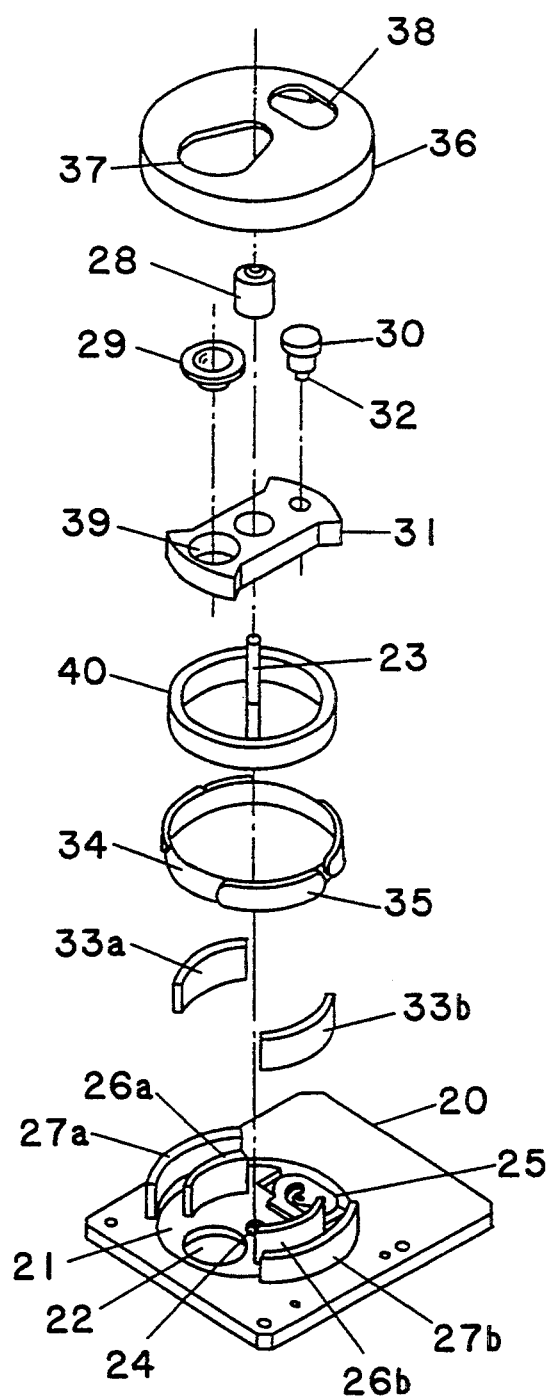
FIG. 1 is a disassembled perspective view showing a first embodiment of the objective actuator according to the present invention.
Figure 2:
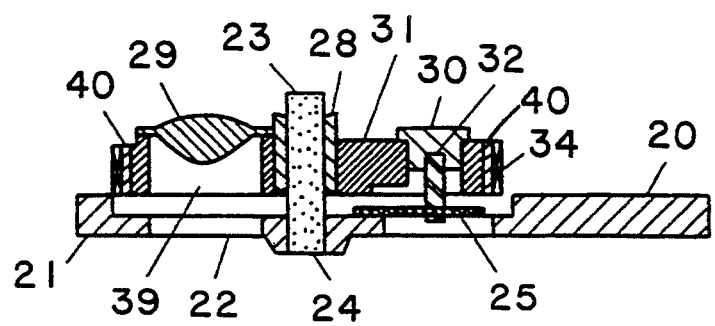
FIG. 2 is a cross-section view of the same view.

One preferred embodiment of the invention will hereinafter be described in detail, referring to FIGS. 1 and 2.

The reference numeral 20 indicates a magnetic metal base having a circular recess 21, in which a beam aperture 22 for passage of a light beam from a light source is locally formed. Centrally formed in said recess 21 is an installation hole 24 for securing a supporting shaft 23 in position, while a rubbery spring 25 is installed within the same recess 21 on the side of said installation hole 24 which is opposite to said beam aperture 22. Furthermore, a pair of arcuate magnet holders 26a and 26b are disposed in said recess 21. Projecting upwards therefrom in juxtaposed positions about a straight line interconnecting the center of said beam aperture 22 and the center of said hole 24, arcuate magnetic path members 27a and 27b are disposed externally of said recess 21 and around said magnet holders 26a and 26b.

The supporting shaft 23 is rigidly mounted in the installation hole 24 of base 20. This supporting shaft 23 has been assembled with a bearing 28 which is rotatable with respect to the axis of shaft 23 and is vertically movable. Secured to this bearing 28 is the center part of an objective holder 31 which is generally rectangular in configuration. An objective 29 is built into the upper part of a beam incidence hole 39 formed in said objective holder 31. This objective 29 and a balancer 30 are assembled with the objective holder 31 in the positions corresponding to the beam aperture 22 and the rubbery spring 25, respectively. A retaining pin 32 disposed at the lower end of said balancer 30 is secured to said rubber spring 25. By this coupling of said retaining pin 32 and rubber spring 25, the objective holder 31 is always allowed to return to a predetermined position after each rotation and vertical movement.

Secured to the outer periphery of said magnet holders 26a and 26b are arcuate magnets 33a and 33b, respectively. A space is provided between the outer periphery of each of said magnets 33a and 33b and the corresponding one of said magnetic path members 27a and 27b.

Secured to the outer periphery of said objective holder 31 is a focusing control coil 34 wound in the shape of a ring via an acrylate resin member 40 and four interconnected arcuate coils constituting a tracking control coil 35 are attached to the outer periphery of said focusing control coil 34 at predetermined intervals. These two kinds of coils 34 and 35 are disposed in a magnetic field generated between said magnets 33a and 33b and said magnetic path members 27a and 27b.

The above assembly is covered with a cover member 36, the upper part of which is formed with windows 37 and 38 in the positions corresponding to said objective 29 plus bearing 28 and said balancer 30, respectively. The window 37 is adapted to pass the light beam transmitted through the objective 29 and also acts as a relief means by which the bearing 28 is protected against hitting and being restricted by the cover on the upward stroke of the objective holder 31. The window 38 also functions as a relief means insuring that the upward movement of the objective holder 31 will not be delimited by the balancer 30 hitting the cover.

In the above arrangement, the light beam from the light source is focused through the objective 29 on the surface of the information recording medium and the defocus of the beam spot and the off-track of the spot with respect to the track groove on the information recording medium are detected. In accordance with the detected quantities, the focusing control coil 34 and tracking control coil 35 are electrically energized to cause magnets 33a and 33b and magnetic path members 27a and 27b to form a magnetic circuit. By utilizing the magnetic flux of this circuit, the objective holder 31, carrying the two kinds of coils 34 and 35 secured to its outer periphery, is rotated around its shaft 23 and driven vertically so as to drive the objective 29 in the focusing and tracking directions.

In this connection, because the acrylate resin member 40 is interposed between the focusing control coil 34 and the objective holder 31, the damping ratio in the movable segment comprising the objective 29, objective holder 31, bearing 28, acrylate resin member 40, focusing control coil 34, tracking control coil 35 and balancer 30 is increased to prevent increases in resonance peak values of the movable segment at high-order resonance frequencies in the focusing and tracking directions so that the stability of the servo is not adversely affected.

Figure 3:
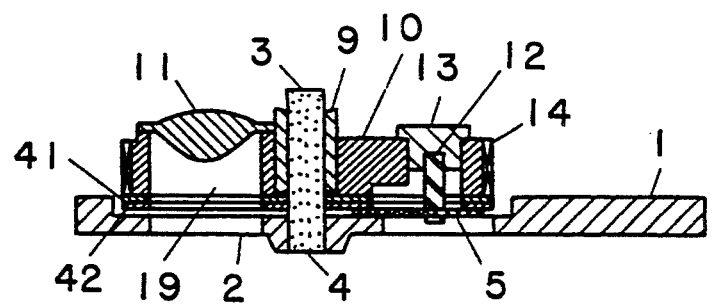
FIG. 3 is a cross-section view showing a second embodiment of the present invention.

FIG. 3 is a sectional elevation view showing a second embodiment of the objective actuator according to the present invention. The like numerals are used to denote the like parts of the conventional actuator already described and any further explanation is omitted. The numerals 1 to 14 in FIGS. 3 and 4 correspond to similar numbers provided hereinabove under BRIEF DESCRIPTION OF THE PRIOR ART describing the architecture of the conventional or prior art objective actuator with the new parts provided by this invention being referred to by the number 41, 42 and 43.

In FIG. 3, the reference numeral 41 represents an acrylate resin member sandwiched between an objective holder 10 and a retaining member or plate 42 made of alumina ceramic and disposed at the bottom of objective holder 10.

Whereas the cardinal part of the conventional movable segment is the objective holder alone, the three-layer structure made up of objective holder 10, retaining plate 42 and interposed acrylate resin member 41 contributes to an increased damping ratio of the movable segment comprising the objective 11, objective holder 10, bearing 9, focusing control coil 14, tracking control coil 15, balancer 13, acrylate resin member 41 and retaining plate 42, so that the resonance peak values of the movable segment at high-order resonance frequencies in the focusing and tracking directions are not increased. At the same time, the high-order resonance frequency of the movable segment can be increased to broaden the frequency band so that the stability of servo function may be fully assured.

Figure 4:
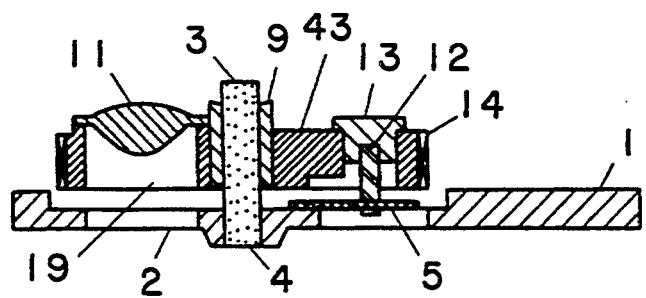
FIG. 4 is a cross-section view showing a third embodiment of the present invention.

FIG. 4 is a sectional elevation view showing a third embodiment of the objective actuator according to the present invention. Here, the like numerals are used to denote the like parts of the prior art objective actuator and any further explanation is omitted.

In FIG. 4, the reference numeral 43 represents an objective holder made of alumina ceramic which is a sintered material.

While the objective holder 10 which constitutes a cardinal part of the movable segment is conventionally made of polyphenylene sulfide resin, epoxy resin or the like material, the use of a sintered material, i.e. alumina ceramic, for this objective holder contributes to enhanced rigidity of the movable segment comprising an objective 11, objective holder 40, bearing 9, focusing control coil 14, tracking control coil 15 and balancer 13, with the result being that the high-order resonance frequencies of the movable segment in the focusing and tracking directions can be increased and the band broadened. Accordingly, the stability of servo is not adversely affected in this embodiment.

Figure 5:
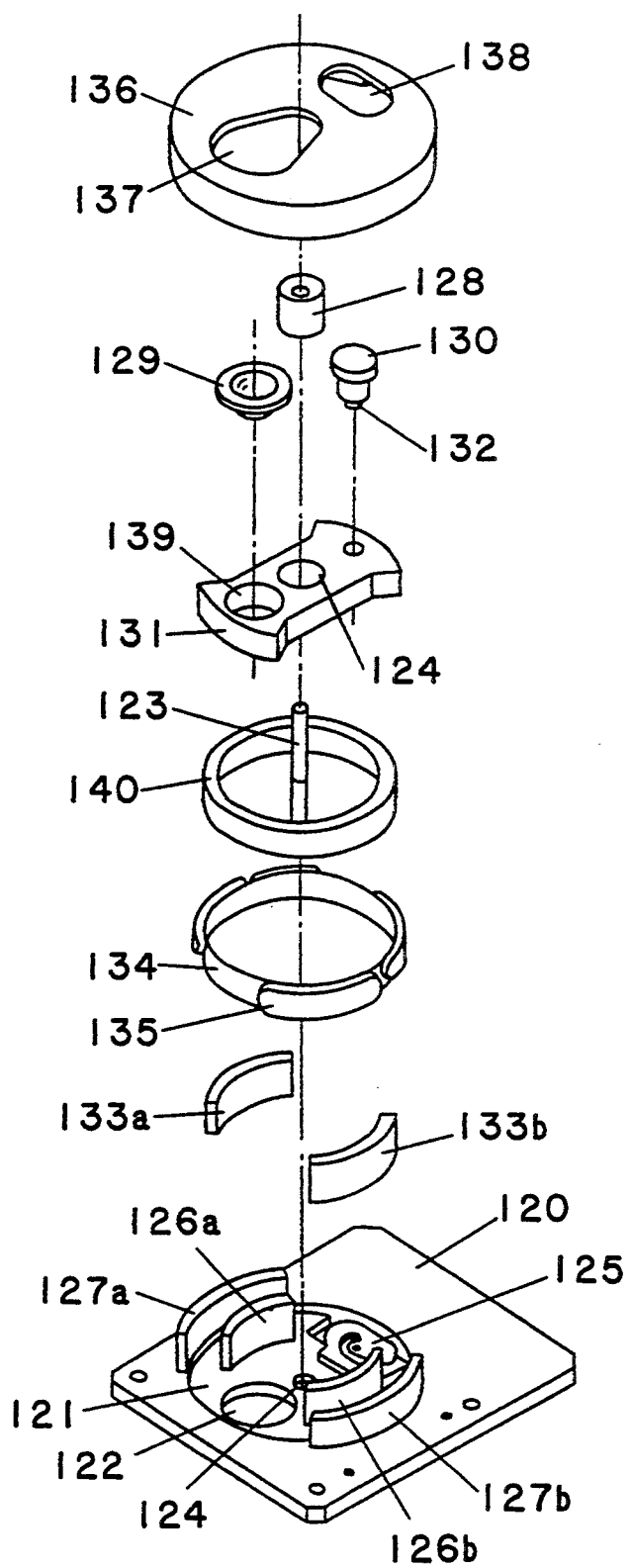
FIG. 5 is a disassembled perspective view showing a fourth embodiment of the present invention.
Figure 6:
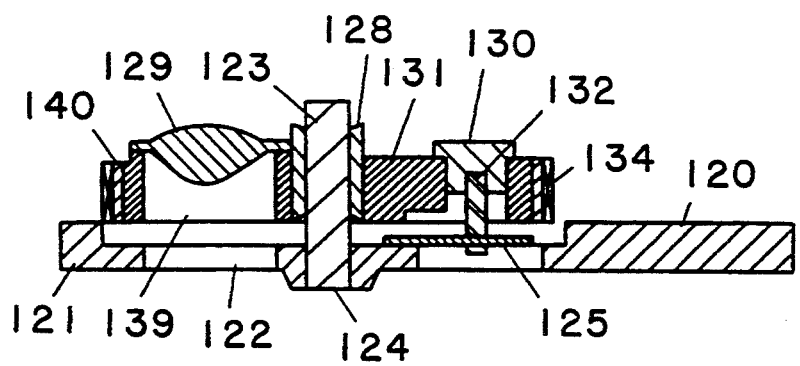
FIG. 6 is a cross-section view of the same.

FIGS. 5 and 6 show a fourth embodiment of the objective actuator according to the present invention. As shown, 120 indicates a magnetic metal base having a top recess 121. Locally formed in this recess 121 is a beam aperture 122 for passage of the light beam from a light source. Formed in the center of the recess 121 is an installation hole 124 adapted to hold a supporting shaft 123 rigidly in position and a rubbery spring 125 is installed within said recess 121 on the side of the installation hole 124 which is opposite to the light beam hole 122. Furthermore, a pair of arcuate magnet holders 126a and 126b are disposed in said recess 121 projecting upwards therefrom in juxtaposed positions about a straight line perpendicular from and parallel to a line interconnecting the center of said beam aperture 122 and the center of said hole 24, and similarly arcuate magnetic path members 127a and 127b are disposed externally of said recess 121 and around said magnet holders 126a and 126b.

The supporting shaft 123 is rigidly mounted in the installation hole 124 of base 120. This supporting shaft 123 has been assembled with a bearing 128 which is rotatable with respect to the axis of the shaft 123 and is vertically movable. Connected to this bearing 128 is the center part of an objective holder 131 which is generally rectangular. An objective 129 is built into the upper part of a light beam incidence hole 139 formed in said objective holder 131. This objective 129 and a balancer 130 are assembled with the objective holder 131 in the positions corresponding to the light beam aperture 122 and the rubbery spring 125, respectively. A retaining pin 132 disposed at the lower end of said balancer 130 is secured to said rubber spring 125. By this coupling of said retaining pin 132 and rubber spring 125, the objective holder 131 is always allowed to return to a predetermined position after each rotation and vertical movement.

Secured to the outer periphery of said magnet holders 126a and 126b are arcuate magnets 133a and 133b, respectively. A space is provided between the outer periphery of each of said magnets 133a and 133b and the corresponding one of said magnetic path members 127a and 127b.

Secured to the outer periphery of said objective holder 131 is a focusing control coil 134 wound in the shape of a ring via an acrylate resin member 140 and four interconnected arcuate coils constituting a tracking control coil 135 are attached to the outer periphery of said focusing control coil 134 at predetermined intervals. These two kinds of coils 134 and 135 are disposed in a magnetic field formed between said magnets 133a and 133b and said magnetic path members 127a and 127b.

The above assembly is covered with a cover 136, the upper part of which is formed with windows 137 and 138 in the positions corresponding to said objective 129 and bearing 128 and said balancer 130, respectively. The window 137 is adapted to pass the light beam transmitted through the objective 129 and also acts as a relief means by which the bearing 128 is protected against hitting and being restricted by the cover on the upward stroke of the objective holder 131. The window 138 also functions as a relief means insuring that the upward movement of the objective holder 131 will not be delimited by the balancer 130 hitting the cover.

In the above arrangement, the light beam from said light source is focused through the objective 129 on the surface of the information recording medium and the defocus of the beam spot and the off-track of the spot with respect to the track groove on the information recording medium are detected. In accordance with the detected quantities, the focusing control coil 134 and tracking control coil 135 are electrically energized to cause said magnets 133a and 133b and magnetic path members 127a and 127b to form a magnetic circuit. By utilizing the magnetic flux of this circuit, the objective holder 131, carrying the two kinds of coils 134 and 135 secured to its outer periphery, is rotated around its axis and driven vertically so as to drive the objective 129 in the focusing and tracking directions.

In this connection, because the objective holder 131 is made of a sintered material, e.g. alumina ceramic, and the acrylate resin member 40 is interposed between the focusing control coil 134 and the objective holder 131, the rigidity of the movable segment comprising the objective 129, objective holder 131, bearing 128, acrylate resin member 140, focusing control coil 134, tracking control coil 135 and balancer 130 can be remarkably increased and the damping ratio of the movable segment can also be increased.

As a consequence, the high-order resonance frequencies of the movable segment in the focusing and tracking directions are prevented from declining and the increases in the resonance peak values at the high-order resonance frequencies in both directions can be precluded, with the result that the stability of the servo, allowing the light beam spot from the objective to follow the plane deflection and radial offset of the information recording medium, is fully maintained.

Figure 7A:
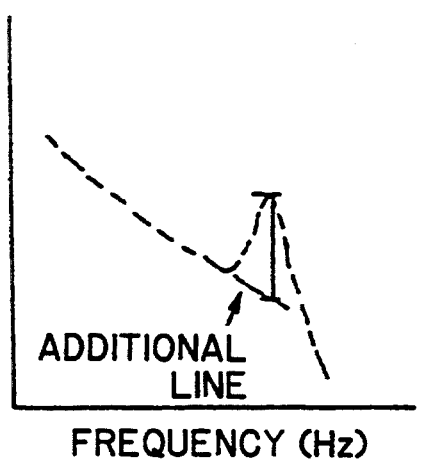
FIG. 7a is a characteristic diagram illustrating frequency characteristics of an objective actuator in accordance with the prior art.
Figure 7B:
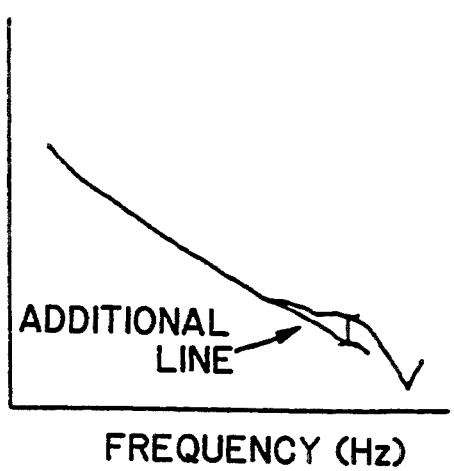
FIG. 7b is a characteristic diagram illustrating frequency characteristics of an objective actuator in accordance with the fourth embodiment of the present invention.
Figure 8:
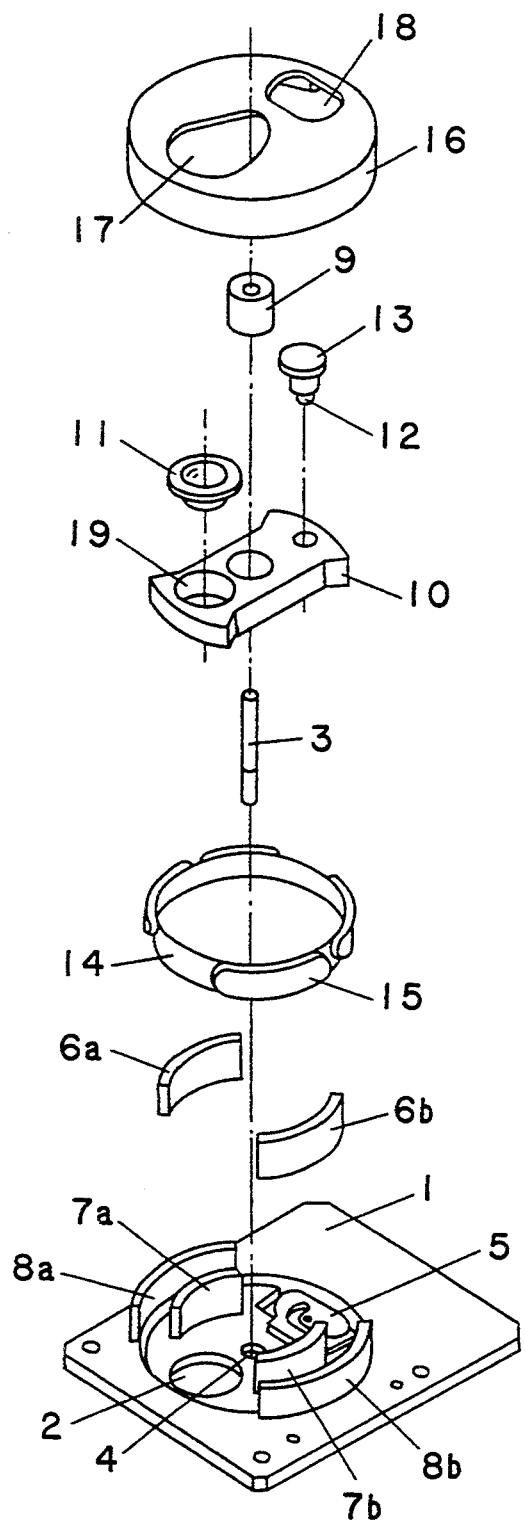
FIG. 8 is a disassembled perspective view showing the prior art objective actuator.
Figure 9:
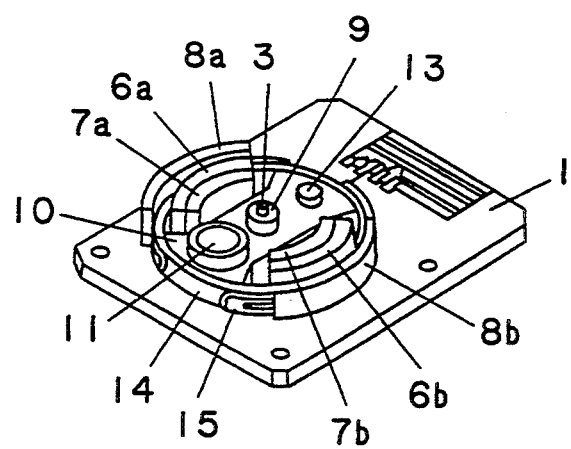
FIG. 9 is a perspective view of the prior art objective actuator.

FIG. 7a is a characteristic diagram illustrating frequency characteristics of an objective actuator in accordance with the prior art. FIG. 7b is a characteristic diagram illustrating frequency characteristics of an objective actuator in accordance with the fourth embodiment of the present invention.

The present invention is applicable to objective actuator employing other lens-supporting systems than the one described herein, such as the wire supporting system and the plate spring supporting system. It should also be understood that the objective holder 10 of the second embodiment (FIG. 3) may be made of the above-mentioned sintered material.

As fully disclosed hereinbefore, the interposition of an acrylate resin member for oscillation control between the lens holder and the control coils in accordance with the present invention helps increase the damping ratio of the movable segment and reduce the resonance peak values of the movable segment at high-order resonance frequencies in the focusing and tracking directions.

Consequently, there is provided an objective actuator which is excellent in oscillation resistance, wherein the stability of the servo allowing the beam spot from the objective to follow the plane deflection and radial offset of the information recording medium, with the additional advantage that this tracking performance is not affected even by external vibration and other interferences.

What is claimed is:

1. An objective actuator functioning as a servo comprising:
   a movable segment comprising an acrylate resin member and an objective holder supporting an objective lens in position, and
   control means for driving said objective holder in directions perpendicular and parallel to an optical axis of said objective lens,
   wherein said acrylate resin member is rigidly interposed between said objective holder and said control means to prevent increases in resonance peak values of said objective actuator at high order resonance frequencies.

2. An objective actuator in accordance with claim 1 wherein said acrylate resin member is rigidly interposed only between said objective holder and said control means.

3. An objective actuator functioning as a servo comprising;
   a movable segment including a three-layered structure comprising:
   (a) an objective holder having a bottom surface, (b) a retaining member disposed on the bottom surface of said objective holder, and (c) an acrylate resin member rigidly interposed between said objective holder and said retaining member, said movable segment for preventing increases in resonance peak values of said objective actuator at high order resonance frequencies;

an objective lens supported in position by said objective holder, control means for driving said objective holder in directions perpendicular and parallel to the optical axis of said objective lens.

4. An objective actuator functioning as a servo comprising:

a movable segment comprising an acrylate resin member and an objective holder supporting an objective lens in position, and control means for driving said objective holder in directions perpendicular and parallel to an optical axis of said objective lens, said objective holder being made of a sintered material wherein said acrylate resin member is rigidly interposed between said objective holder and said control means to prevent increases in resonance peak values of said objective actuator at high order resonance frequencies.

5. An objective actuator in accordance with claim 4 wherein said acrylate resin member is rigidly interposed only between said objective holder and said control means.

6. An objective actuator functioning as a servo comprising;

a movable segment including a three-layered structure comprising:

(a) an objective holder made of a sintered material and having a bottom surface, (b) a retaining member disposed on the bottom surface of said objective holder, and (c) an acrylate resin member rigidly interposed between said objective holder and said retaining member, said movable segment for preventing increases in resonance peak values of said objective actuator at high order resonance frequencies:

an objective lens supported in position by said objective holder, control means for driving said objective holder in directions perpendicular and parallel to the optical axis of said objective lens.

* * * * *